Nov. 5, 1968
K. VAN DE PLASCH
3,408,958
WEATHERPROOF COVER JOINT
Filed Aug. 15, 1966
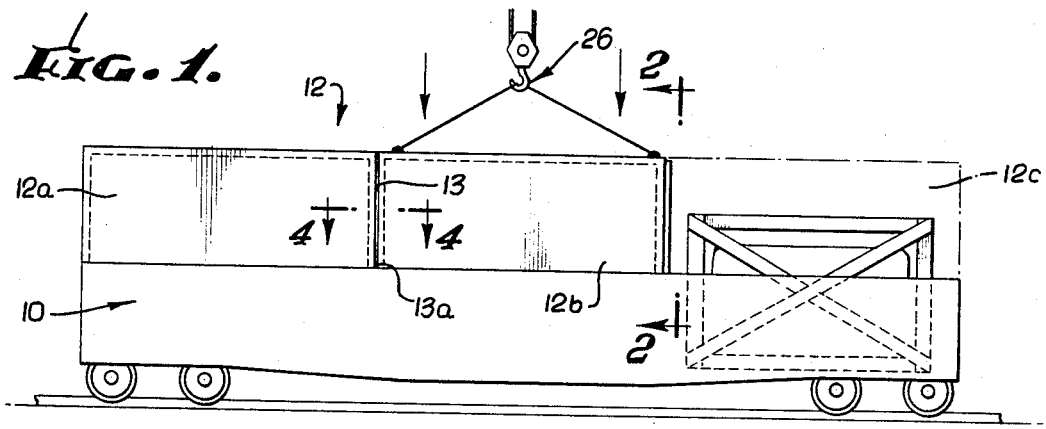
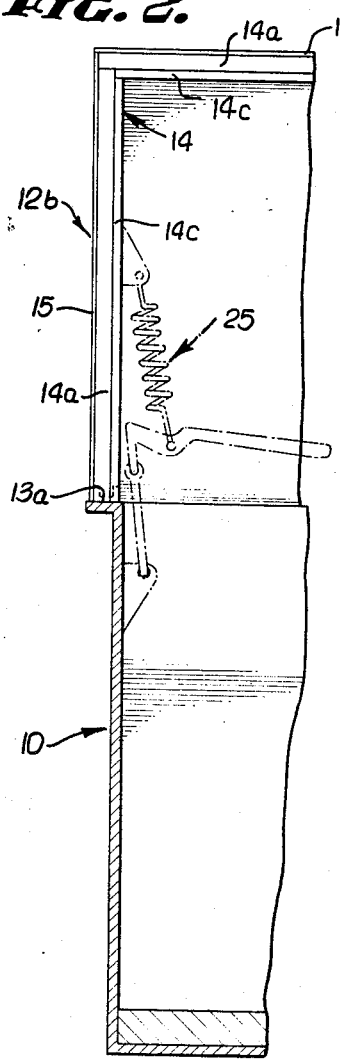
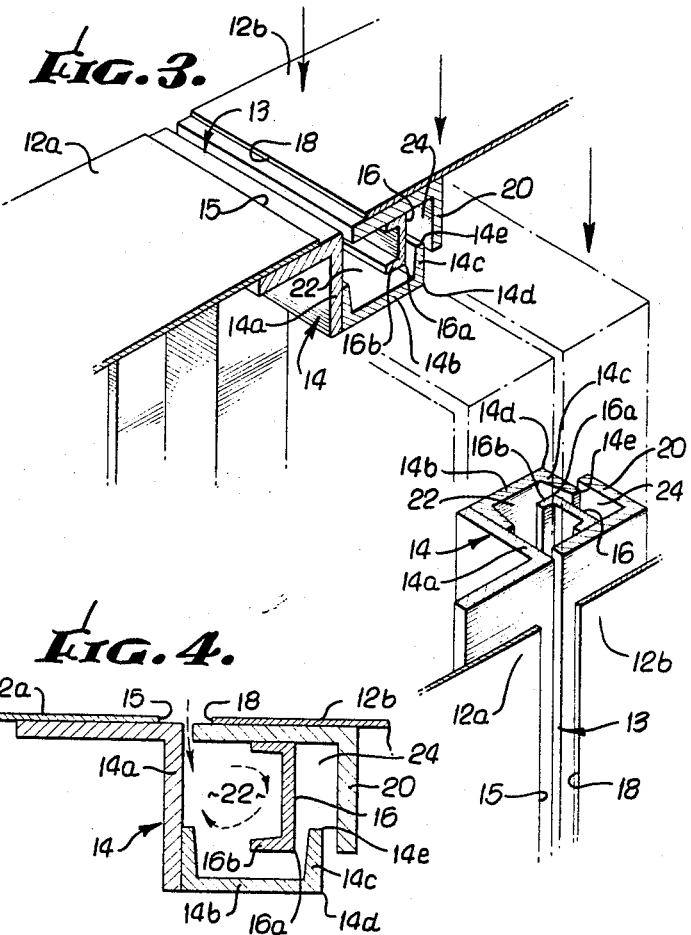
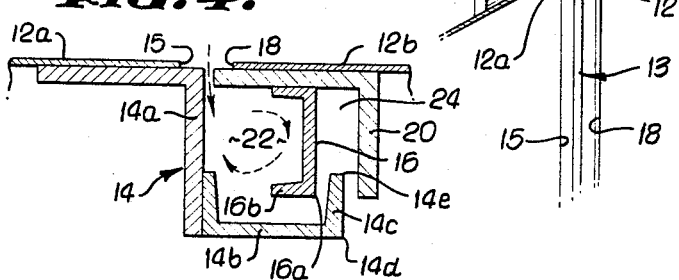
INVENTOR.
KENNETH VAN DE PLASCH
BY
Huebner & Worrel
ATTORNEYS.

United States Patent Office 3,408,958
Patented Nov. 5, 1968

3,408,958
WEATHERPROOF COVER JOINT
Kenneth Van De Plasch, Saugus, Calif., assignor to C. L. Stegall Company, Pacoima, Calif., a corporation of California
Filed Aug. 15, 1966, Ser. No. 572,361
8 Claims. (Cl. 105—377)

ABSTRACT OF THE DISCLOSURE

A weatherproof joint or water trap between adjacent cover sections utilized on a support structure as, for example, a gondola freight car. The joint is such that after one cover section is in place, which mounts part of the joint, a second section which mounts a cooperating part of the joint may be vertically lowered into place whereby the weatherproof joint is automatically completed.

---

This invention relates to an interconnecting joint especially suitable for use in a cover having mating sections. More particularly this joint utilizes spaced mating channel and plate structures which are disposed at the adjacent marginal edges of the sections in such a manner that the interior of the cover is effectively sealed from any leakage of moisture past the joint.

Illustrative of the type of cover on which this invention is suitable for use are variable shaped detachable roof sections on gondola-type railroad freight cars. Prior to this invention when it was required that the interior of such cars be protected against inclement weather to prevent moisture from damaging the contents therein it was a common practice to provide the interconnecting joint between adjacent sections of a cover with resilient seals. A particularly annoying and expensive problem was caused by the rapid deterioration of these seals under normal usage. That is, the seals were firmly pressed together to prevent leakage, but the shaking and rocking of the railroad car when in motion created extensive frictional wear which rapidly destroyed the weatherproofing characteristics of the resilient seals. Other types of interconnections did not provide the practical weatherproofing characteristics desired.

Therefore, it is an object of this invention to provide a weatherproof connecting joint or water trap for use between cover sections that effectively prevents the entry of moisture past the joint.

Another object of this invention is to provide a weatherproof connecting joint for use between cover sections which is durable and extremely resistant to deterioration through wear.

Still another object of this invention is to provide a weatherproof interconnection for use between sections of a cover which can be quickly engaged and disengaged.

A further object of this invention is to provide a weatherproof detachable interconnection between joined sections of a cover which includes spaced mating elements, wherein a portion of one of said mating elements forms a baffle plate which prevents the entry of moisture past the interconnection, and another portion of a mating element forms a gutter for draining off water at the interconnecting joint.

Other objects and advantages will become apparent from the following drawings wherein:

FIGURE 1 is an elevational view of a gondola railroad freight car with two sections of a three section cover in place thereon;

FIGURE 2 is a sectional view taken through line 2—2 in FIGURE 1;

FIGURE 3 is a perspective view, partly sectioned, of the interconnection between sections of a cover as in FIGURE 1; and FIGURE 4 is a cross-sectional view of the interconnecting joint between cover sections taken through line 4—4 in FIGURE 1.

Referring to the drawings, particularly FIGURE 1, the subject invention is illustrated as it may be used with a gondola-type railroad freight car 10 which has a rectangular cover 12 that is open at the bottom and is comprised of mating sections 12a, 12b and a third section 12c not yet in place but indicated by phantom lines. Each of the sections are interconnected by a weatherproof joint 13. Cover 12 can be formed in various configurations which are adapted to the shape of the items to be sheltered and can include a multiplicity of sections interconnected by structures in accordance with this invention like joint 13. Moreover such a cover can be fitted to a variety of vehicles and containers or simply be used as a cover for items stored.

As illustrated the joint 13 extends transversely across the top of the interconnection between the cover sections 12a and 12b and down both sides thereof so that water is drained from the bottom thereof as at 13a, and moisture is blocked from entering the interior of the cover 12. The description hereinafter of the elements of joint 13 will first indicate the pertinent operative relationship of the members without specifying the particular type of structure illustrated which, as can be seen from the drawings, are elongated stock angle and channel structures.

The joint 13 includes an inwardly recessed channel 14 extending along the marginal edge 15 of section 12a and a baffle plate 16 extending perpendicularly inwardly from the inside surface of section 12b near its marginal edge 18. Also extending perpendicularly from the inside surface of 12b is a rear plate or baffle 20 spaced inwardly from marginal edge 18 and baffle plate 16.

Channel 14 is comprised of a back wall 14a extending inwardly from marginal edge 15 substantially normal (vertical) to section 12a, a floor section or gutter 14b extending outwardly from the bottom edge of back wall 14a and substantially normal thereto and an upturned channel flange 14c extending normally from the outer edge 14d of gutter 14b. Thus, channel 14 takes the form of a somewhat square-shaped reverse J (as viewed in the drawing) since the extension of wall 14a from section 12a, that is the depth of wall 14a, is relatively greater than the height of flange 14c and parallel thereto.

When sections 12a and 12b are secured in place to form part of cover 12 their outer surfaces are in substantially the same plane and their respective marginal edges 15 and 18 are adjacent to each other, but slightly spaced so that normally they do not bear against each other. Baffle plate 16 is spaced from marginal edge 15 less than the width of gutter 14b and extends inwardly from section 12b a distance which is less than the depth of wall 14a but greater than the depth of wall 14a with the height of gutter flange 14c subtracted therefrom.

Thus, the bottom edge 16a of baffle plate 16 overlaps the top edge 14e of flange 14d so that a precipitation chamber in the form of an internal channel space 22 is formed beneath section 12b which is roughly bounded by wall 14a, gutter 14b and baffle plate 16. Projecting into this channel space 22 from the bottom edge 16a of baffle plate 16, and roughly normal thereto, is a baffle flange or lip 16b which is sufficiently short that it does not bear against wall 14a. Ordinarily the bottom edge 16a of baffle plate 16 is spaced so that it is relatively close to gutter flange 14c.

Rear plate 20 extends inwardly from section 12b a greater distance than the depth of wall 14a with the height of gutter flange 14c subtracted therefrom. Moreover, rear plate 20 is adjacent to gutter flange 14c but is spaced a greater distance from marginal edge 15 of section 12a than the width of gutter 14b so that it overlaps gutter flange 14c on the opposite side from the overlapping of baffle plate 16 and an air circulation space 24 is formed between plates 14 and 16 above flange 14c. However, as in the other portions of the interconnection formed by joint 13 rear plate 20 is spaced so that it does not bear against the adjacent gutter flange 14c.

Though the elements of this joint 13 were previously described in relationship to their functional pertinence as a weatherproof interconnection such a joint 13 is especially desirable because it can be made from stock angle and channel structures, as illustrated in the drawings. Thus, the element labeled channel 14 is comprised of a right angle iron welded to the inside of section 12a near marginal edge 15, the extended leg of which forms wall 14a, and a channel structure, a side wall of which is welded to the inwardly extending edge of this angle iron so as to provide gutter 14b and gutter flange 14c. In a like manner rear plate 20 is an inwardly extending leg of a right angle iron welded to the inside of cover section 12b near its marginal edge 18. Moreover baffle plate 16 is a channel structure with one side wall welded to the inside surface of the leg of the angle iron forming rear plate 20 which is welded to section 12b.

As noted previously, the various sections of this interconnection are ordinarily spaced from each other so that a weatherproof joint 13 which prevents moisture from entering the interior of cover 12 is provided thereby. It is believed that this occurs because moisture laden air will enter into the joint 13 between marginal edges 15 and 18 of sections 12a and 12b, respectively, and due to the configuration and location of baffle plate 16 and flange 16b, be swirled around in channel space 22 as indicated by the dotted lines in FIGURE 4 and the liquid dropped therefrom as in a precipitation chamber into gutter 14b through which it is drained outside of cover 12 as at 13a. The overlapping of baffle plate 16 and rear plate 20 on both sides of gutter flange 14c forms a water trap which substantially prevent moisture laden air from passing gutter flange 14c until the liquid likely to precipitate has been dropped therefrom. Moreover, the spacing of the sections prevents entry of liquid inside the cover 12 through capillary-type flow and virtually eliminates frictional wear between the interconnected sections 12a and 12b at joint 13.

Due to the overlapping of baffle plate 16 and back plate 20 with gutter flange 14c the sections of the cover 12 are interconnected by first placing section 12a in position and then lowering section 12b into position relative thereto as shown by the lifting apparatus 26 in FIGURE 1. If a number of sections are interconnected by joints 13 in accordance with this invention, the connecting edge of the section having a channel 14 receives the connecting edge of the section having a baffle plate 16 in a like manner. That is, the section 12c in FIGURE 1 would have a baffle plate 16 received by a channel 14 in section 12b where they are interconnected together.

Since it is believed that the weatherproofing characteristics of a joint 13 are attributable to the particular configuration and relative location when interconnected to the adjacent parts thereof means are provided to secure the interconnected sections in position to effect this relationship. Thus, as shown in FIGURE 2 tongue and slot fittings (not shown) with hook and eye chain tie downs 24 for example are used to secure cover section 12b to gondola car 10 in a predetermined position.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

I claim:

1. In combination a support structure, a first cover section installed on the support structure, a second cover section removably installed on said support structure adjacent the first section, each section protecting an area therebelow, the sections embodying complementary adjacent marginal edges slightly spaced from each other, an elongated weatherproof joint between the two sections permitting free separation of the second section from the first section in a direction transversely of the joint, said joint comprising a channel mounted on the first section at the region of its marginal edge, said channel comprising a wall, a floor section extending outwardly from the wall and substantially normal thereto, a flange extending from the floor section generally parallel to the wall but of less height than the latter, the flange being disposed inwardly of the second cover section, and a baffle plate mounted on the second cover section in the general region of its marginal edge, said baffle plate being generally parallel to the wall and terminating short of the floor section but overlapping the flange and positioned between and in spaced relationship to, the wall and flange, whereby water entering between the marginal edges of the cover sections will be trapped in the channel and deterred from entering the area protected by either of the cover sections, but providing a sinuous air passage between the flange and the baffle plate.

2. In combination a support structure, a first cover section installed on the support structure, a second cover section removably installed on said support structure adjacent the first section, each section protecting an area therebelow the sections embodying complementary adjacent marginal edges slightly spaced from each other, an elongated weatherproof joint between the two sections permitting free separation of the second section from the first section in a direction transversely of the joint, said joint comprising a channel mounted on the first section at the region of its marginal edge, said channel having a cross-sectional form comprising a vertical portion, a floor portion, and an upturned flange of lesser height than the vertical portion, the floor portion extending under and the flange being disposed under the second cover section, and a vertical baffle plate mounted on and depending from the second cover section in the general region of its marginal edge, said baffle plate being spaced from the flange in partially vertical overlapping relationship thereto and disposed between the flange and the vertical portion, the baffle plate carrying a lip at its lower edge projecting toward the vertical portion, whereby water entering between the adjacent marginal edges of the cover sections will be trapped in the channel and deterred by the baffle plate, lip and flange from entering the space protected by the cover sections, but providing a sinuous air passage between the flange, the baffle plate, the lip and the floor portion.

3. In combination a support structure, a first cover section installed on the support structure, a second cover section removably installed on said support structure adjacent the first section, each section protecting an area therebelow, the sections embodying complementary adjacent marginal edges slightly spaced from each other, an elongated weatherproof joint between the two sections permitting free separation of the second section from the first section in a direction transversely of the joint, said joint comprising a channel mounted on the first section at the region of its marginal edge, said channel having a cross-sectional form comprising a vertical portion, a floor portion, and an upturned flange of lesser height than the vertical portion, the floor portion extending under and the flange being disposed under the second cover section, and a baffle plate assembly mounted on the second cover section in the general region of its marginal edge, said assembly comprising spaced apart generally parallel baffle plates straddling the flange in partially vertical overlapping relationship thereto and spaced therefrom on both sides thereof, whereby water entering between the adjacent marginal edges of the cover sections will be trapped in the channel and deterred from entering the space protected by the cover sections, but providing a sinuous air passage between the flange and the baffle plates.

4. A combination as defined in claim 3 wherein the baffle plate closest to the vertical portion is formed with a lip generally normal to the baffle plate and extending toward the vertical portion to provide in conjunction with the channel a precipitation chamber where swirling of water may occur at a point relatively remote from the sinuous passage between the flange and the baffle plates.

5. A combination as defined in claim 3 wherein the cover sections have generally flat tops lying in the same general plane, the marginal edges being the ends of the tops, the vertical portion of the channel being substantially normal to the plane of the tops, and the floor portion being substantially parallel to the plane of the tops.

6. A combination as defined in claim 5 wherein the baffle plates and the flange are normal to the plane of the tops.

7. A combination as defined in claim 4 wherein the lip is substantially parallel to the plane of the tops.

8. A combination as defined in claim 3 wherein the support structure is a vehicle, and the cover sections are enclosures for protection of cargo loaded on the vehicle.

References Cited

UNITED STATES PATENTS

| | | | |
|---|---|---|---|
| 2,837,040 | 6/1958 | Johansson | 105—377 |
| 2,949,867 | 8/1960 | Ramsey | 105—377 |
| 3,145,665 | 8/1964 | Hamilton | 105—377 |
| 3,190,239 | 6/1965 | Davis et al. | 105—378 |

ARTHUR L. LA POINT, *Primary Examiner.*

R. A. BERTSCH, *Assistant Examiner.*